US011934922B2

(12) United States Patent
Awasthy et al.

(10) Patent No.: US 11,934,922 B2
(45) Date of Patent: Mar. 19, 2024

(54) PREDICTIVE DATA AND MODEL SELECTION FOR TRANSFER LEARNING IN NATURAL LANGUAGE PROCESSING

(71) Applicant: International Business Machines Corporation, Armonk, NY (US)

(72) Inventors: Parul Awasthy, Ossining, NY (US); Bishwaranjan Bhattacharjee, Yorktown Heights, NY (US); John Ronald Kender, Leonia, NY (US); Radu Florian, Danbury, CT (US); Hui Wan, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 832 days.

(21) Appl. No.: 17/066,685

(22) Filed: Oct. 9, 2020

(65) Prior Publication Data

US 2022/0114473 A1   Apr. 14, 2022

(51) Int. Cl.
G06Q 20/00   (2012.01)
G06F 16/28   (2019.01)
G06N 20/00   (2019.01)

(52) U.S. Cl.
CPC ........... G06N 20/00 (2019.01); G06F 16/285 (2019.01)

(58) Field of Classification Search
CPC ............................. G06N 20/00; G06F 16/285
See application file for complete search history.

(56) References Cited

U.S. PATENT DOCUMENTS

| 10,354,159 | B2 * | 7/2019  | Savvides | G06F 18/24143 |
| 10,354,362 | B2 * | 7/2019  | Savvides | G06F 18/214   |
| 10,467,500 | B1 * | 11/2019 | Bao      | G06N 3/08     |
| 10,545,029 | B2 * | 1/2020  | Yang     | G01C 21/3811  |
| 10,670,416 | B2 * | 6/2020  | Wheeler  | G01C 21/3811  |
| 10,859,395 | B2 * | 12/2020 | Wheeler  | G06V 10/34    |
| 10,956,673 | B1 * | 3/2021  | Ramezani | G06F 40/30    |
| 11,138,423 | B2 * | 10/2021 | Torres   | G06V 30/412   |

(Continued)

FOREIGN PATENT DOCUMENTS

CN   108009593   5/2018

OTHER PUBLICATIONS

Ciocca, Elsevier, 2018, pp. 70-77.*

(Continued)

Primary Examiner — Michael I Ezewoko
(74) Attorney, Agent, or Firm — Kimberly S. Zillig

(57) ABSTRACT

A computer system, product, and method are provided. The computer system includes an artificial intelligence (AI) platform operatively coupled to a processor. The AI platform includes tools in the form of a machine learning model (MLM) manager, a metric manager, and a training manager. The MLM manager accesses a plurality of pre-trained source MLMs, and inputs a plurality of data objects of a test dataset into each of the source MLMs. The test dataset includes the plurality of data objects associated with respective labels. For each source MLM, associated labels are generated from the inputted data objects and a similarity metric is calculated. The MLM manager selects a base MLM to be used for transfer learning from the plurality of source MLMs based upon the calculated similarity metric. The training manager trains the selected base MLM with a target dataset for the target domain.

14 Claims, 9 Drawing Sheets

(56) References Cited

U.S. PATENT DOCUMENTS

| | | | |
|---|---|---|---|
| 11,163,989 B2* | 11/2021 | Sun | G06V 10/809 |
| 11,188,766 B2* | 11/2021 | Rahimpour | G05D 1/0246 |
| 11,366,968 B2* | 6/2022 | Torres | G06V 20/62 |
| 11,386,114 B2* | 7/2022 | Singh | G06F 40/216 |
| 11,657,590 B2* | 5/2023 | Gubbi Lakshminarasimha | |
| | | | G06N 3/08 |
| | | | 382/190 |
| 11,704,602 B2* | 7/2023 | Torres | G06F 40/126 |
| | | | 706/12 |
| 11,790,889 B2* | 10/2023 | Fernández | G06F 40/30 |
| | | | 707/693 |
| 2011/0071965 A1 | 3/2011 | Long et al. | |
| 2016/0247501 A1 | 8/2016 | Kim et al. | |
| 2019/0354850 A1 | 11/2019 | Watson et al. | |
| 2020/0134469 A1 | 4/2020 | Choo et al. | |
| 2021/0166009 A1* | 6/2021 | Sun | G06V 40/23 |
| 2021/0172756 A1* | 6/2021 | Wheeler | G01C 21/3867 |
| 2021/0319420 A1* | 10/2021 | Yu | G06V 20/52 |

OTHER PUBLICATIONS

Gao, Elsevier, 2019, pp. 1-11.*

Talo, Elsevier, 2019, pp. 1-8.*

Thyreau, Elsevier, 2017, pp. 214-228.*

Zahedi, Elsevier, Jun. 2020, pp. 1-23.*

Afridi, Muhammad Jamal, et al., "On Automated Source Selection for Transfer Learning in Convolutional Neural Networks", Pattern Recognition, 73 (2018), pp. 65-75.

Anonymous, "Ranking and Automatic Selection of Machine Learning Models", IPCOM000252275D, Jan. 3, 2018.

Bhattacharjee, Bishwaranjan, et al., "P2L: Predicting Transfer Learning for Images and Semantic Relations", asrXiv: 1908.07630v1, Aug. 20, 2019.

Patricia, Novi, et al., "Learning to Learn, from Transfer Learning to Domain Adaptation: A Unifying Perspective", Proceedings of the IEEE Conference on Computer Vision and Pattern Recognition (CVPR), 2014, pp. 1442-1449.

Devlin, Jacob, et al., "BERT: Pre-training of Deep Bidirectional Transformers for Language Understanding", arXiv:1810.04805v2, May 24, 2019.

Razavian, Ali Sharif, et al., "CNN Features off-the-shelf: an Astounding Baseline for Recognition", arXiv:1403.6382v3, May 12, 2014.

Bengio, Yoshua, "Deep Learning of Representations for Unsupervised and Transfer Learning", JMLR: Workshop and Conference Proceedings 27:17-37 (2012).

Coucke, Alice, et al., "Benchmarking Natural Language Understanding Systems: Google, Facebook, Microsoft, Amazon, and Snips", Jun. 2017.

Dahl, Deborah, A., et al., "Expanding the Scope of the ATIS Task: the ATIS-3 Corpus", Human Language Technology: Proceedings of a Workshop, Mar. 8-11, 1994.

Florian, Radu, et al., "A Statistical Model for Multilingual Entity Detection and Tracking", Technical Report, 2004.

Jiang, Jing, "Multi-Task Transfer Learning for Weakly-Supervised Relation Extraction" 4th International Joint Conference on Natural Language Processing, Association for Computational Linguistics, 2009.

Luo, Zelun, "Label Efficient Learning of Transferable Representations across Domains and Tasks", 31st Conference on Neural Information Processing Systems (NIPS), 2017.

Mikolov, Tomas, "Distributed Representations of Words and Phrases and their Compositionality", Advances in Neural Information Processing Systems, 2013.

Nguyen, Thien H., et al., "A Two-stage Approach for Extending Event Detection to New Types via Neural Networks", Proceedings of the 1st Workshop on Representation Learning for NLP, pp. 158-165, Berlin, Germany, Aug. 11, 2016.

Peterson, Leif, E., "K-nearest neighbor" Scholarpedia, 4(2); 1883, (2009).

Sang, Erik F., et al., "Introduction to the CoNLL-2003 Shared Task: Language-Independent Named Entity Recognition", 2003.

Schultz, Lex R., et al., "Distance Based Source Domain Selection for Sentiment Classification", arXiv:1808.09271v1, Aug. 28, 2018.

Socher, Richard, et al., "Zero-Shot Learning Through Cross-Modal Transfer", arXiv:1301.3666v2, Mar. 20, 2013.

Sussillo, David, et al., "Transferring Learning from External to Internal Weights in Echo-State Networks with Sparse Connectivity", PLoS One, vol. 7, Issue 5, May 2012.

Wagstaff, Kiri, et al., "Constrained K-means Clustering with Background Knowledge", Proceedings of the Eighteenth International Conference on Machine Learning, 2001, p. 577-584.

Wolf, Thomas, et al., "Transformers: State-of-the-Art Natural Language Processing", arXiv:1910.03771v5, Jul. 14, 2020.

Zhou, Shuang, et al., "Largest Source Subset Selection for Instance Transfer", JMLR: Workshop and Conference Proceedings 45:423-438, 2015.

Lin, Di, et al., "Double-bootstrapping source data selection for instance-based transfer learning", Pattern Recognition etters 34 (2013), pp. 1279-1285.

Torrey, Lisa, et al., "Transfer Learning", Handbook of Research on Machine Learning Applications, 2009.

* cited by examiner

PREDICTIVE DATA AND MODEL SELECTION FOR TRANSFER LEARNING IN NATURAL LANGUAGE PROCESSING

STATEMENT REGARDING FEDERALLY SPONSORED RESEARCH OR DEVELOPMENT

This invention was made with Government support under Government Contract Number FA8750-19-C-1001 awarded by the Defense Advanced Research Projects Agency. The Government has certain rights to this invention.

BACKGROUND

The present embodiments relate to transfer learning, and in certain exemplary embodiments improvements to a system, computer program product, and method for selecting a source model for transfer learning.

When deploying deep learning in real-life scenarios, training data is sometimes sparse. Transfer learning improves learning of target tasks (also referred to as domains) by leveraging knowledge from a source task or domain. Generally, a source model from the source domain is selected as a base model for transfer learning, and is fine-tuned on one or more datasets of the target domain. However, the performance of the resulting target model depends on the suitability of the chosen source model for the target domain. Selection of a most suitable source model can be problematic, resulting in sub-optimal performance and computationally expensive operations.

SUMMARY

The embodiments include a system, a computer program product, and a method for selecting and training a machine learning model for transfer learning, including in particular embodiments in relation to natural language processing.

In one aspect, a computer system is provided with a processing unit operatively coupled to memory, and an artificial intelligence (AI) platform operatively coupled to the processing unit. The AI platform includes tools in the form of a machine learning model (MLM) manager, a metric manager, and a training manager. The MLM manager is configured to access a plurality of pre-trained source MLMs, and input a plurality of data objects of a test dataset into each of the source MLMs. The test dataset includes the plurality of data objects associated with respective labels. For each of the source MLMs, the MLM manager is further configured to generate associated labels from the inputted data objects. The metric manager is configured to calculate a metric reflecting a similarity between the labels of the test dataset and the generated labels is calculated. The MLM manager is configured to select a base MLM to be used for transfer learning from the plurality of source MLMs based upon the calculated similarity metric. In an exemplary embodiment, the MLM manager captures knowledge of the selected base MLM, uses a context representation of the selected base MLM, and replaces a classification layer of the selected base MLM with a new classifier mapped to space of a target dataset. The training manager is configured to train the selected base MLM with a target dataset for the target domain.

In another aspect, a computer program product is provided to utilize machine learning to facilitate transfer learning. The computer program product includes a computer readable storage medium having program code embodied therewith. Program code, which is executable by a processor, is provided. The program code is configured to access a plurality of pre-trained source MLMs, and input a plurality of data objects of a test dataset into each of the source MLMs. The test dataset includes the plurality of data objects associated with respective labels. The program code is executable to, for each of the source MLMs, generate associated labels from the inputted data objects and calculate a metric reflecting a similarity between the labels of the test dataset and the generated labels. The program code is executable to select a base MLM to be used for transfer learning from the plurality of source MLMs based upon the calculated similarity metric, and train the selected base MLM with a target dataset for the target domain. In an exemplary embodiment, knowledge of the selected base MLM is captured, a context representation of the selected base MLM is employed, and a classification layer of the selected base MLM is replaced with a new classifier mapped to space of the target dataset.

In yet another aspect, a method is provided that includes carrying out operations on a computing device comprising a processor operably associated with memory. The operations include accessing a plurality of pre-trained source machine learning models (MLMs), and accessing a test dataset of a target domain. The test dataset comprises a plurality of data objects associated with labels. The data objects of the test dataset are input into each of the source MLMs generating associated labels for each of the source MLMs. For each of the source MLMs, a metric reflecting a similarity between the labels of the test dataset and the generated labels is calculated. A base MLM to be used for transfer learning is selected from the plurality of MLMs based upon the calculated similarity metric. In an exemplary embodiment, knowledge of the selected base MLM is captured, a context representation of the selected base MLM is used, and a classification layer of the selected base MLM is replaced with a new classifier mapped to space of a target dataset. The selected base MLM is trained with a target dataset for the target domain.

These and other features and advantages will become apparent from the following detailed description of the exemplary embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments, unless otherwise explicitly indicated.

DETAILED DESCRIPTION

Figure 1A:
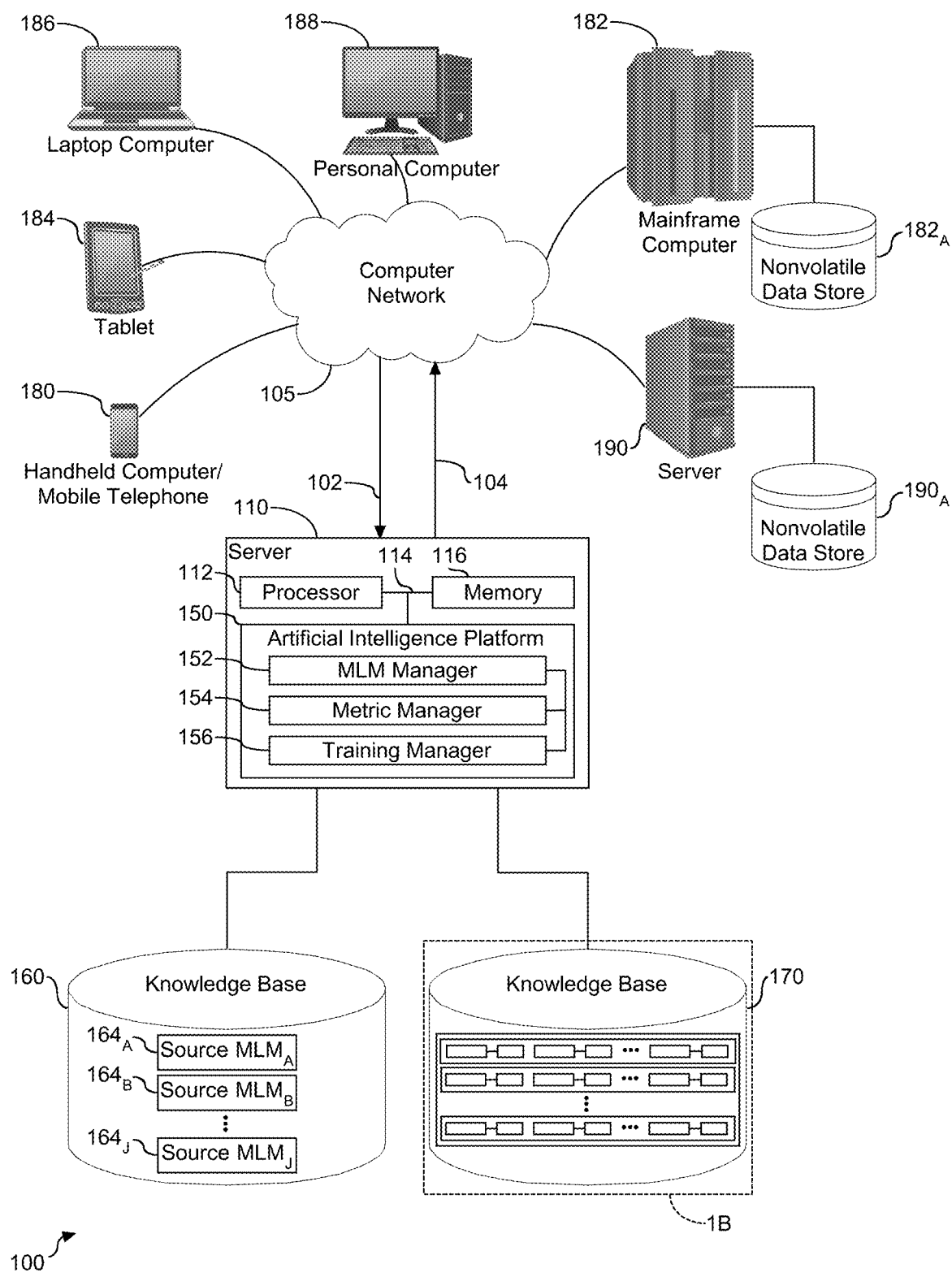
FIG. 1A depicts a schematic diagram of a computer system to support and enable selection and training of a source machine learning model in connection with transfer learning.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment. It should be understood that the various embodiments may be combined with one another and that any one embodiment may be used to modify another embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Artificial Intelligence (AI) relates to the field of computer science directed at computers and computer behavior as related to humans. AI refers to the intelligence when machines, based on information, are able to make decisions, which maximizes the chance of success in a given topic. More specifically, AI is able to learn from a dataset to solve problems and provide relevant recommendations. For example, in the field of artificial intelligent computer systems, natural language systems (such as the IBM Watson® artificially intelligent computer system or other natural language interrogatory answering systems) process natural language based on system-acquired knowledge. To process natural language, the system may be trained with data derived from a database or corpus of knowledge, but the resulting outcome can be incorrect or inaccurate for a variety of reasons.

Machine learning (ML), which is a subset of Artificial Intelligence (AI), utilizes algorithms to learn from data and create foresights based on this data. AI refers to the intelligence when machines, based on information, are able to make decisions, which maximizes the chance of success in a given topic. More specifically, AI is able to learn from a dataset to solve problems and provide relevant recommendations. Cognitive computing is a mixture of computer science and cognitive science. Cognitive computing utilizes self-teaching algorithms that use minimum data, visual recognition, and natural language processing to solve problems and optimize human processes.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based upon an express or inherent relationship within the structure. Adequate datasets are relied upon for building those structures. A problem that arises in connection with building those structures and deployment of a machine learning model (MLM) is that an adequate dataset is not always available. Indeed, when deploying deep learning in real-life scenarios, training data is often sparse. A poorly trained MLM produces less than optimal results.

Transfer learning leverages knowledge from a first source domain or task to apply the knowledge to a second or "target" domain or task. For example, according to an embodiment a source machine learning model (MLM) associated with the source domain is selected as a base MLM, and is fine-tuned (or further trained with a target dataset) for the target domain. However, the performance to the trained target model can depend upon the particular source MLM chosen for transfer learning. Simply selecting the source MLM with the largest dataset can lead to sub-optimal performance. Alternatively, fine-tuning or training all source MLMs to provide a plurality of target MLMs, and thereafter comparing the performance of each of the target MLMs to one another can be computationally expensive and onerous.

According to exemplary embodiments described in further detail below, a prediction technique for a sequence label task is provided that selects, for a given target domain, the optimal source model or source models for that target domain.

Referring to FIG. 1A, a schematic diagram of a computer system (100) is provided with tools for transfer learning, including, for example, in connection with natural language processing. As shown, a server (110) is provided in communication with a plurality of computing devices (180), (182), (184), (186), (188), and (190) across a network connection (105). The server (110) is configured with a processor (112) in communication with memory (116) across a bus (114). The server (110) is shown with an artificial intelligence (AI) platform (150) to support transfer learning. More specifically, the AI platform (150) is configured with one or more tools to calculate a metric for multiple source MLMs, select at least one source MLM as a base MLM, and train the selected MLM with a target dataset for a target domain. The computing devices (180), (182), (184), (186), (188), and (190) communicate with each other and with other devices or components via one or more wired and/or wireless data communication links, where each communication link may comprise one or more of wires, routers, switches, transmitters, receivers, or the like. Other embodiments of the server (110) may be used with components, systems, sub-systems, and/or devices other than those that are depicted herein.

The artificial intelligence (AI) platform (150) is shown herein configured to receive input (102) from various sources. For example, the AI platform (150) may receive input, such as actions or terms, across the network (105) from one or more of the plurality of computing devices (180), (182), (184), (186), (188), and (190). Furthermore, and as shown herein, the AI platform (150) is operatively coupled to a knowledge base (160) populated with source models, shown herein by way of example as Source $MLM_A$ (164$_A$), Source $MLM_B$ (164$_B$), Source MLM (164$_J$). It is understood that each source model may have a corresponding source data set (not shown).

The input, e.g. source machine learning models, are leveraged to select at least one source MLM to serve as a base model for transfer learning, for example, in connection with a natural language processing (NLP) domain, as shown and described below. The neural networks are individually referred to herein as a source MLMs. The quantity of source model ($164_A$), ($164_B$), and ($164_J$) is for illustrative purposes and should not be considered limiting. Each source dataset (not shown) associated with a corresponding source model, e.g. ($164_A$), ($164_B$), and ($164_J$) includes one or more data objects and associated labels.

The AI platform (150) is further shown in communication with another Knowledge Base (170), also referred to herein as a target knowledge base or a second knowledge base, with Library (172) that includes a plurality of target datasets. Although only one library (172) is shown in the Knowledge Base (170), it should be understood that the Knowledge Base (170) may include additional libraries. It should further be understood that the Knowledge Bases (160) and (170) may be joined together or divided into further knowledge bases. The source libraries are shown and described herein for descriptive purposes. As further described the tools and corresponding method and computer program product requires the source models, and does not require access to any source dataset for operation.

Figure 1B:
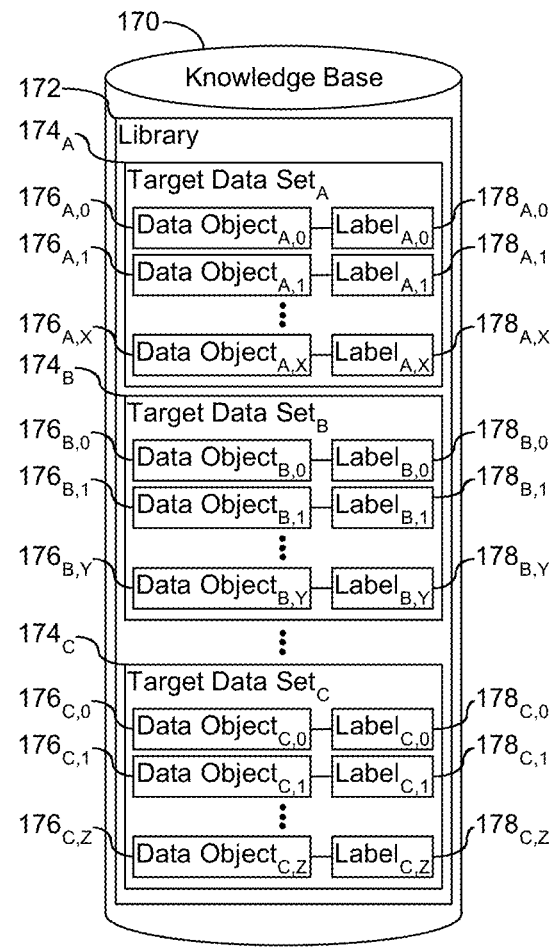
FIG. 1B is a schematic diagram of Box 1B of FIG. 1A.

FIG. 1B, which is an enlarged and detailed view of the knowledge base (170), shows three target datasets, Target Dataset$_A$ ($174_A$), Target Dataset$_B$ ($174_B$), and Target Dataset$_C$ ($174_C$), although it should be understood that this quantity is representative and fewer or more target datasets may be included in the Library (170).

Similar to the source datasets, the target datasets include multiple objects and corresponding labels. By way of example, Target Dataset$_A$ ($174_A$) includes Data Object$_{A,0}$ ($176_{A,0}$) and associated Label$_{A,0}$ ($178_{A,0}$), Data Object$_{A,1}$ ($176_{A,1}$) and associated Label$_{A,1}$ ($178_{A,1}$), and Data Object$_{A,X}$ ($176_{A,X}$) and associated Label$_{A,X}$ ($178_{A,X}$). The Target Dataset$_B$ ($174_B$) includes Data Object$_{B,0}$ ($176_{B,0}$) and associated Label$_{B,0}$ ($178_{B,0}$), Data Object$_{B,1}$ ($176_{B,1}$) and associated Label$_{B,1}$ ($178_{B,1}$), and Data Object$_{B,Y}$ ($176_{B,Y}$) and associated Label$_{B,Y}$ ($178_{B,Y}$). The Target Dataset$_C$ ($174_C$) includes Data Object$_{C,0}$ ($176_{C,0}$) and associated Label$_{C,0}$ ($178_{C,0}$), Data Object$_{C,1}$ ($176_{C,1}$) and associated Label$_{C,1}$ ($178_{C,1}$), and Data Object$_{C,Z}$ ($176_{C,Z}$) and associated Label$_{C,Z}$ ($178_{C,Z}$). In an embodiment, the quantity of data objects and associated labels in each target dataset is the same, e.g., X=Y=Z. In another embodiment, two or more of the target datasets contain a different quantity of data objects and associated labels, e.g., X≠Y≠Z.

The AI platform (150) is shown herein with tools to support selecting a base MLM from a plurality of candidate, pre-trained source MLMs, and training the selected base MLM. The AI platform (150) tools are shown herein as machine learning model (MLM) manager (152), a metric manager (154), and a training manager (156). The tools (152), (154), and (156) are operatively coupled, directly or indirectly, and provide the functions, as described below.

According to an embodiment, the MLM manager (152) functions to access two or more pre-trained source MLMs, such as but not limited to, Source MLM$_A$ ($164_A$), Source MLM$_B$ ($164_B$), and Source MLM ($164_J$). The MLM manager (152) inputs data objects of a test dataset into each of the accessed source MLMs. The test dataset includes data objects and corresponding labels. Examples of the test dataset, data objects and corresponding labels are shown in the knowledge base (170), and more specifically, in library (172). Each accessed source MLM generates associated labels (not shown) from the inputted data objects.

According to an embodiment, the metric manager (154) calculates a metric reflecting a similarity between the labels of the test dataset and the labels generated by the source MLMs. In an exemplary embodiment, the labels of the test dataset (e.g., Label$_{A,0}$ ($178_{A,0}$), Label$_{A,1}$ ($178_{A,1}$), etc.) represent ground truth data, and may be pre-determined, for example, by a subject matter expert (SME). The labels of one or more test dataset are input into the source MLMs (e.g., Source MLM$_A$ ($164_A$), Source MLM$_B$ ($164_B$), and Source MLM$_J$ ($164_J$)) to generate labels, which are then compared to the test dataset labels. An exemplary similarity metric for use by the metric manager (154) is described in further detail below in connection with Equation (1), the description of which is incorporated herein by reference. In an exemplary embodiment, the calculated metric comprises, for each of the source MLMs, an assessment the labels of the test dataset compared to generated labels associated with the source MLMs, wherein each of the assessments is individually selected as a true positive, a false positive, or a false negative.

According to another embodiment, the metric manager (154) determines, for each of the source MLMs, e.g., Source MLM$_A$ ($164_A$), Source MLM$_B$ ($164_B$), and Source MLM ($164_J$), a respective score or weight based on at least one respective source dataset (not shown) used to pre-train the source MLM. The score represents an accuracy of the source MLM with respect to a respective source domain. The metric manager (154) includes the score (or weight) in determining a weighted similarity metric. An exemplary weighted similarity metric for use by the metric manager (154) is described in further detail below in connection with Equation (2), the description of which is incorporated herein by reference. In an exemplary embodiment, the calculated metric is limited to a position of the returned output, wherein the position is selected from a span, a bounding box, or a location. The weighted similarity metric determines an accuracy measure of one or more inferences of the target dataset, with the weighted similarity metric leveraged by the metric manager (154) to calculate a weight of one or more of the source MLMs.

According to an exemplary embodiment, the MLM manager (152) is further configured to select a base MLM from among the source MLMs, e.g., from among Source MLM$_A$ ($164_A$), Source MLM$_B$ ($164_B$), and Source MLM ($164_J$), based upon the calculated similarity metric or weighed similarity metric. The selected source MLM is used for transfer learning. In an exemplary embodiment, the MLM manager (152) captures knowledge of the selected base MLM, uses a context representation of the selected base MLM, and replaces a classification layer of the selected base MLM with a new classifier mapped to space of a target dataset.

The training manager (156) is configured to train the selected base MLM with a target dataset for the target domain. In exemplary embodiments, target dataset or sets used for training may be contained in Library (172), another library within the target knowledge base (170), or within another knowledge base.

In some illustrative embodiments, server (110) may be the IBM Watson® system available from International Business Machines Corporation of Armonk, New York, which is augmented with the mechanisms of the illustrative embodiments described hereafter. The MLM manager (152), the metric manager (154), and the training manager (156) hereinafter referred to collectively as AI tools, are shown as being embodied in or integrated within the AI platform (150) of the server (110). In an embodiment, the AI tools may be implemented in a separate computing system (e.g., server 190) that is connected across network (105) to the server (110). Wherever embodied, the AI tools function to support accessing and calculating a metric for each of a plurality of source MLMs dedicated to respective first domains, to predict a 'best' model from among the plurality of source model. The AI tools function to select the 'best' source model and to further fine-tune the selected model on a target dataset.

Types of information handling systems that can utilize the AI platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store (190$_A$), and mainframe computer (182) utilizes nonvolatile data store (182a). The nonvolatile data store (182$_A$) can be a component that is external to the various information handling systems or can be internal to one of the information handling systems.

The information handling system employed to support the AI platform (150) may take many forms, some of which are shown in FIG. 1A. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, the information handling system may embody the north bridge/south bridge controller architecture, although it will be appreciated that other architectures may also be employed.

Figure 2:
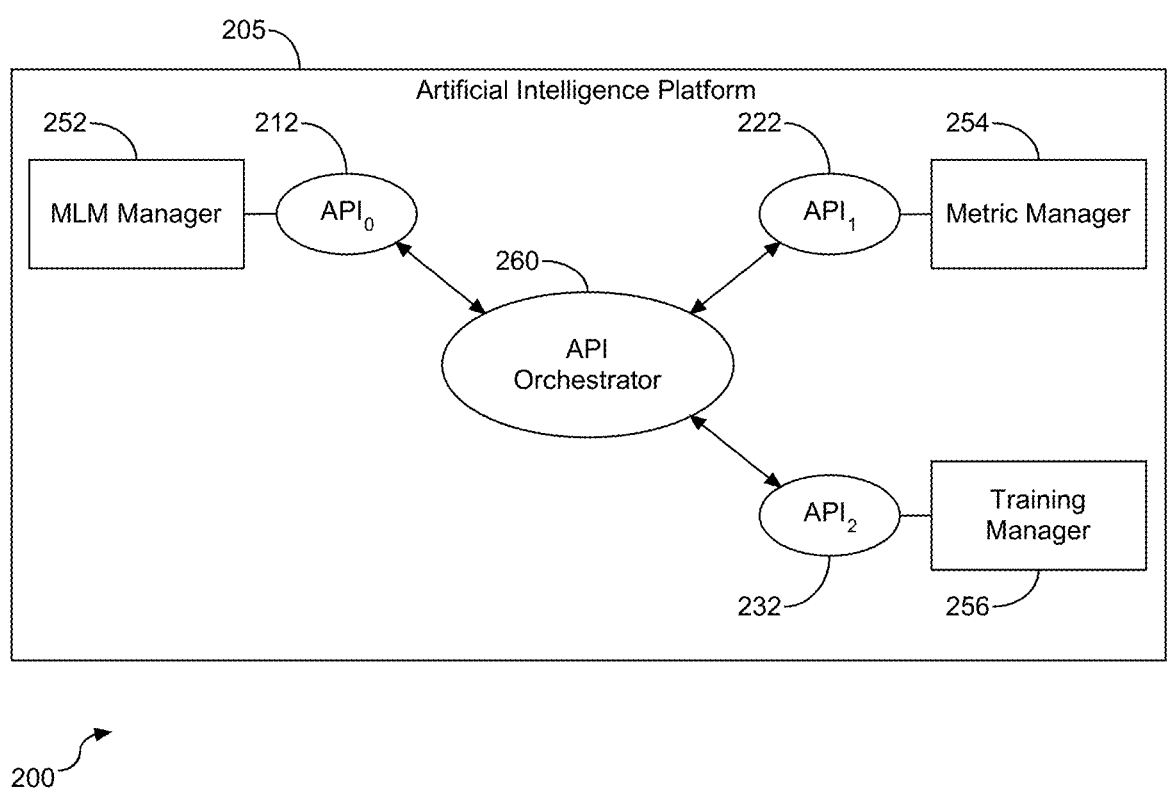
FIG. 2 depicts a block diagram illustrating the AI platform tools, as shown and described in FIGS. 1A and 1B, and their associated application program interfaces (APIs).

An Application Program Interface (API) is understood in the art as a software intermediary between two or more applications. With respect to the artificial intelligence platform (150) shown and described in FIG. 1A, one or more APIs may be utilized to support one or more of the tools (152), (154), and (156) and their associated functionality. Referring to FIG. 2, a block diagram (200) is provided illustrating the tools (152), (154), and (156) and their associated APIs. As shown, a plurality of tools are embedded within the artificial intelligence platform (205), with the tools including a MLM manager (252) associated with API$_0$ (212), a metric manager (254) associated with API$_1$ (222), and a training manager (256) associated with API$_2$ (232). Each of the APIs may be implemented in one or more languages and interface specifications.

As shown, API$_0$ (212) is configured to support and enable the functionality represented by the MLM manager (252). API$_0$ (212) provides functional support to access pre-trained source MLMs, input data objects of a test dataset into the source MLMs and generate associated labels; API$_1$ (222) provides functional support to calculate a metric reflecting a similarity between the labels of test dataset the generated labels; and API$_2$ (232) provides functional support training a selected neural network from the source MLM using transfer learning based on the calculated metric. As shown, each of the APIs (212), (222), and (232) are operatively coupled to an API orchestrator (260), otherwise known as an orchestration layer, which is understood in the art to function as an abstraction layer to transparently thread together the separate APIs. In an embodiment, the functionality of the separate APIs may be joined or combined. In another embodiment, the functionality of the separate APIs may be further divided into additional APIs. As such, the configuration of the APIs shown herein should not be considered limiting. Accordingly, as shown herein, the functionality of the tools may be embodied or supported by their respective APIs.

Figure 3:
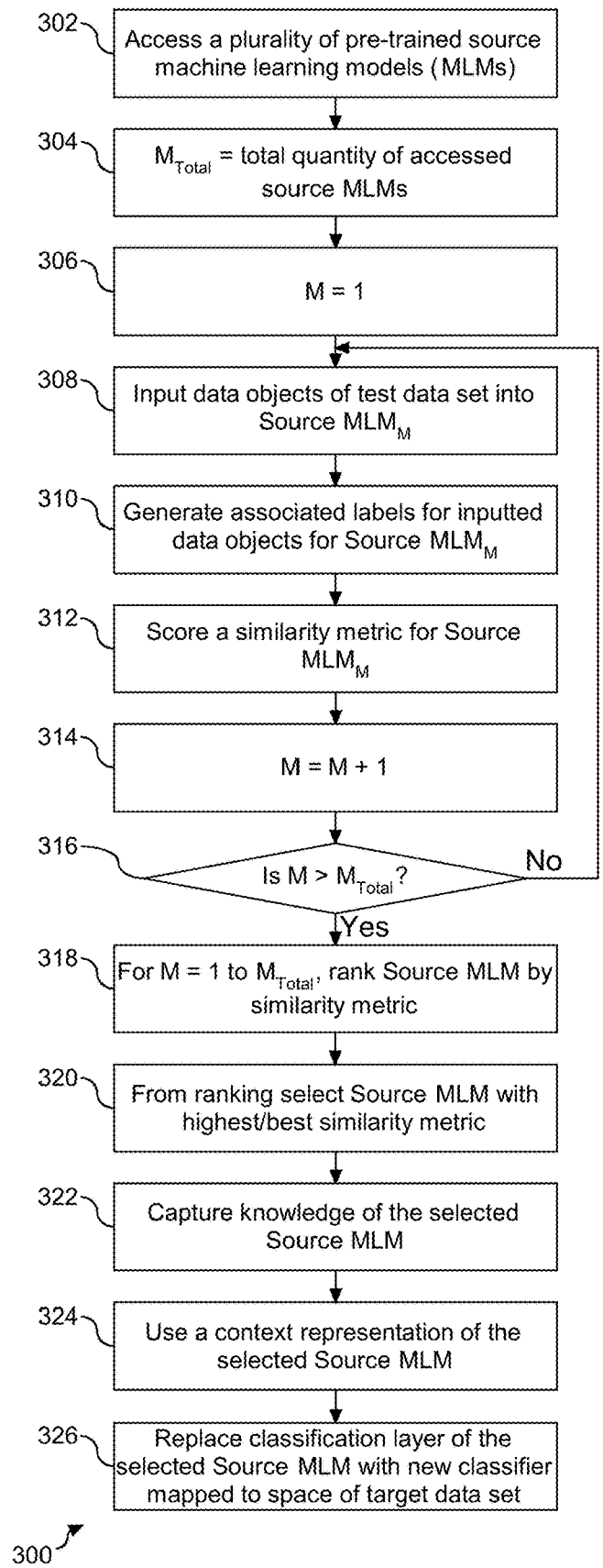
FIG. 3 depicts a flow chart illustrating an embodiment of a process for selecting a base MLM from among a plurality of source MLMs for transfer learning.

Referring to FIG. 3, a flow chart (300) is provided illustrating an embodiment of a process for selecting a base MLM from among a plurality of source MLMs. A plurality of pre-trained source machine learning models (or source MLMs) is accessed. The total quantity of accessed source MLMs is assigned value M$_{Total}$ (304), and a corresponding source MLM counting variable, M, is initialized (306). The data objects of a test dataset are input into Source MLM$_M$ (308), and the Source MLM$_M$ generates associated labels for the inputted data objects (310). A similarity metric for the source MLM$_M$ is assessed, e.g. scored (312). Details of the assessment are described in detail below. Following the assessment, the variable M is incremented (314), followed by a decision whether each of the source MLMs has been subject to the similarity metric assessment (316). A non-affirmative response to the decision (316) causes a return to step (308) to process the next source MLM. On the other hand, an affirmative response to the decision (316) is interpreted as an indication that each of the source MLMs have been scored or assessed for the similarity metric. The source MLMs are ranked or otherwise ordered by their scores (318), and the source MLM with the highest ranking is selected as the base MLM for use in transfer learning (320). In an exemplary embodiment, ranking or ordering may comprise determining only the source MLM with the optimal or highest ranking.

According to an exemplary embodiment, the scoring (312) is determined using a Mention Span Similarity (MSS) equation (Equation (1)), also referred to herein as an F1 score, below:

$$MSS = \frac{TP}{TP + \frac{1}{2}(FP + FN)} \quad (1)$$

wherein TP is defined as the quantity of true positives, FP is defined as the quantity of false positives, and FN is defined as the quantity of false negatives. According to an exemplary embodiment, TP is assigned to an extracted mention, e.g. extracted string, to a first match between an offset, e.g. bias, of the extracted mention and ground truth, FP is assigned to an extracted mention having a first match between the offset and the extracted mention and a non-match with ground truth, and FN is assigned to an extracted mention having a non-match between the offset of the extracted mention and a non-match with ground truth.

Returning to FIG. 3, according to an embodiment, knowledge of the selected Source MLM is captured (322), and a context representation of the selected base MLM is used (324). A classification layer of the selected base MLM is replaced with a new classifier mapped to the space of a target dataset.

Figure 4:
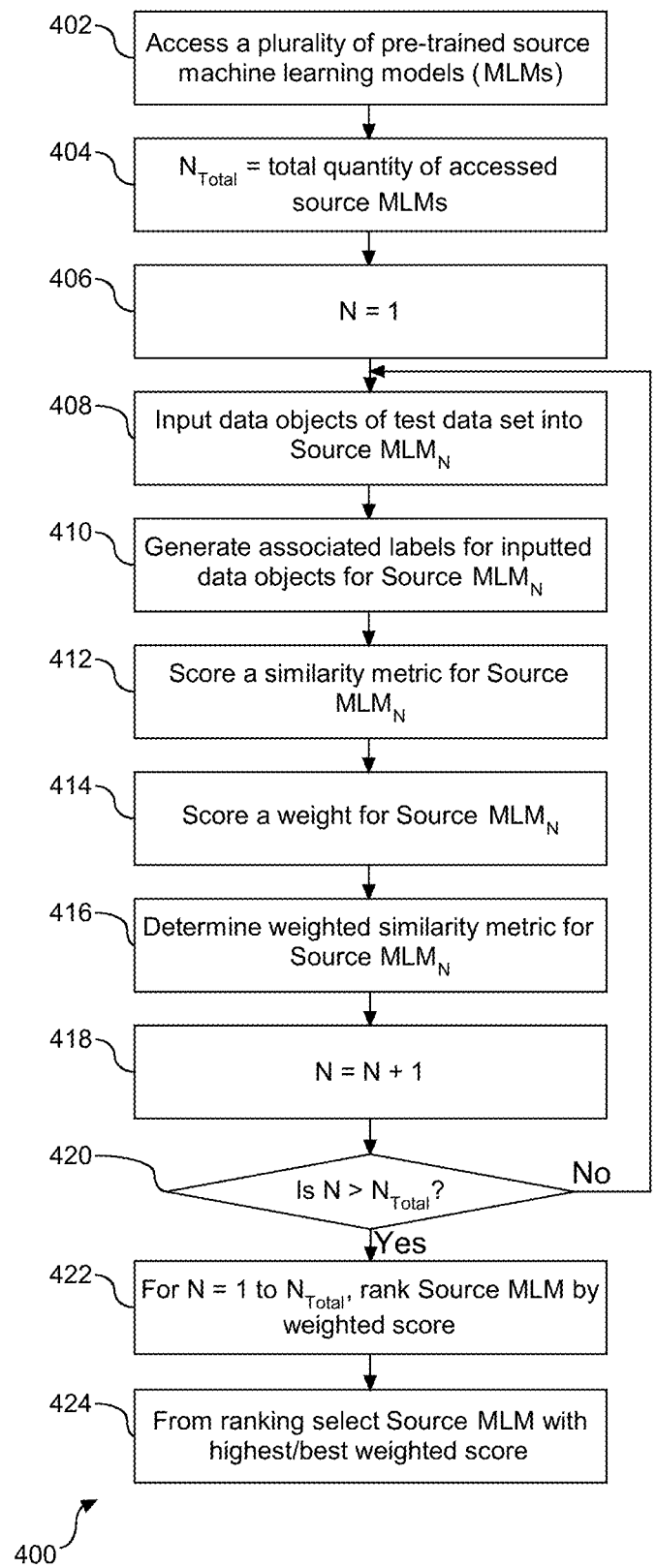
FIG. 4 depicts a flow chart illustrating another embodiment of a process for selecting a base MLM from among a plurality of source MLMs for transfer learning.

Referring to FIG. 4, a flow chart (400) is provided illustrating another embodiment of a process for selecting a base MLM from among a plurality of source MLMs. A plurality of pre-trained source machine learning models (or source MLMs) is accessed. The total quantity of accessed source MLMs is assigned value $N_{Total}$ (404), and a source MLM counting variable N is initialized (406). The data objects of a test dataset are input into Source $MLM_N$ (408), and the Source $MLM_N$ generates associated labels for the inputted data objects (410). A similarity metric for the source $MLM_N$ is scored (412). A weight score for the source $MLM_N$ is determined (414). According to an exemplary embodiment, the weight score is based on at least one respective source dataset (not shown) used to pre-train the source MLM. According to another exemplary embodiment, the weight score represents an accuracy of the source MLM with respect to the source domain for which the source MLM was pre-trained. According to an embodiment, the weight score may be the F1 score shown and described in Equation 1. A weighted similarity metric score is determined (416). Details of the assessment with respect to the weighted similarity metric score are described in detail below. Thereafter, the source MLM counting variable N is incremented (418), followed by a decision whether each of the source MLMs have been subject to the assessment (420). A non-affirmative response to the decision (420) causes a return to step (408) to process the next source MLM. On the other hand, an affirmative response to the decision (420) is interpreted as an indication that each of the source MLMs have been scored. The source MLMs are ranked or otherwise ordered by their weighted similarity metric scores (422), and the source MLM with the highest ranking is selected as the base MLM for use in transfer learning (424). In an exemplary embodiment, ranking or ordering may involve only determining the source MLM with the optimal or highest weighted similarity metric score.

According to an exemplary embodiment, the weighted score (416) is determined using a Weighted Mention Span Similarity (WMSS) Equation (2) below:

$$WMSS = \frac{\text{SCORE WEIGHT}}{100} * MSS \qquad (2)$$

where MSS is the value obtained in FIG. 3 and the score weight is a score of the source model, e.g. the F1 score of the source model, on a source dataset.

Figure 5:
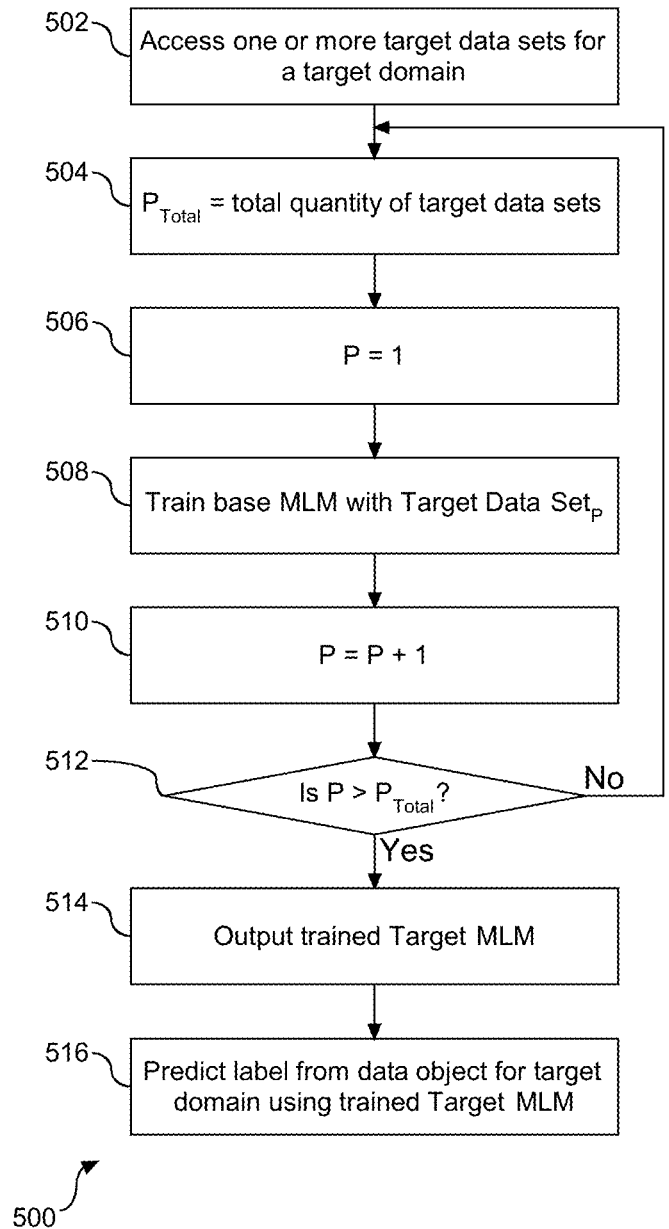
FIG. 5 depicts a flow chart illustrating an embodiment of a process for training or fine-tuning the selected base MLM with target data.

Referring to FIG. 5, a flow chart (500) is provided to illustrate an embodiment of a process for training or fine-tuning the selected base MLM, such as determined using the flow chart of FIG. 3 or FIG. 4, with target data. One or more target datasets for a target domain are accessed (502). The total quantity of target datasets is assigned the value $P_{Total}$ (504), and a corresponding dataset counting variable, P, is initialized (506). The base MLM is subject to training with Target Dataset$_P$ (508). Thereafter, the target dataset counting variable P is incremented (510), followed by a decision as to whether each of the target datasets that is the subject of the base MLM training has taken place (512). A non-affirmative response to the decision (512) is following by a return to step (508) to process the next source target dataset for training the selected base MLM. On the other hand, an affirmative response to the decision (512) is interpreted as an indication that the each of the target datasets has been used to train the selected base MLM. The trained base MLM, also referred to as a trained target MLM, is output (514). The outputted target MLM may then be used to predict a label or labels from data objects for a target domain (516).

Aspects of selecting a base MLM from a plurality of MLMs for transfer learning, and training the selected base MLM in connection with another domain are shown and described with the tools and APIs shown in FIGS. 1A and 2, respectively, and the processes shown in FIGS. 3, 4, and 5. Aspects of the functional tools (152), (154), and (156) and their associated functionality may be embodied in a computer system/server in a single location, or in an embodiment, may be configured in a cloud-based system sharing computing resources. With references to FIG. 6, a block diagram (600) is provided illustrating an example of a computer system/server (602), hereinafter referred to as a host (602) in communication with a cloud-based support system, to implement the processes described above with respect to FIGS. 3-5. Host (602) is operational with numerous other general purpose or special purpose computing system environments or configurations. Examples of well-known computing systems, environments, and/or configurations that may be suitable for use with host (602) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (602) may be described in the general context of computer system-executable instructions, such as program modules, being executed by a computer system. Generally, program modules may include routines, programs, objects, components, logic, data structures, and so on that perform particular tasks or implement particular abstract data types. Host (602) may be practiced in distributed cloud computing environments (610) where tasks are performed by remote processing devices that are linked through a communications network. In a distributed cloud computing environment, program modules may be located in both local and remote computer system storage media including memory storage devices.

Figure 6:
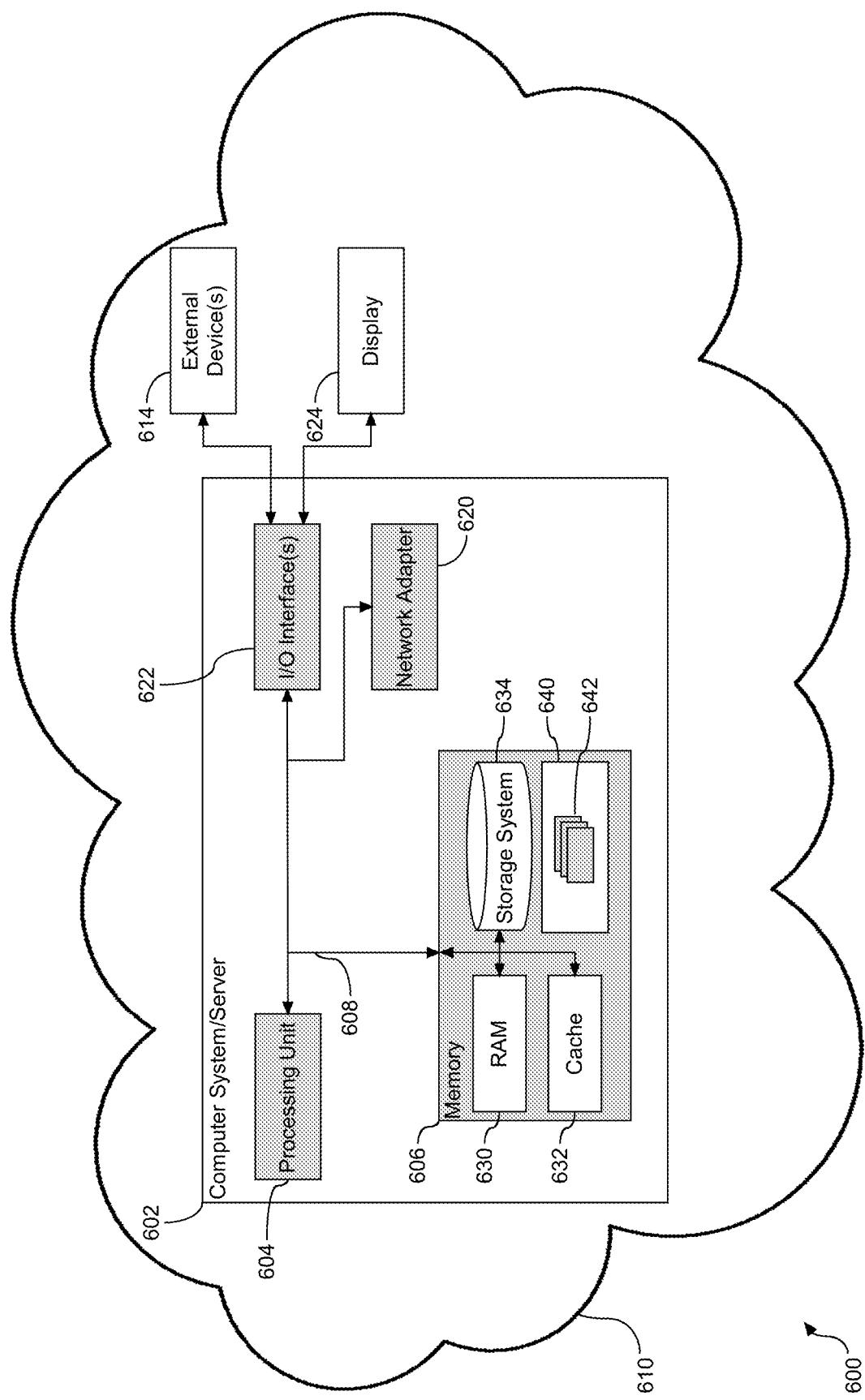
FIG. 6 depicts a block diagram illustrating an example of a computer system/server of a cloud based support system, to implement the system and processes described above with respect to FIGS. 1A-5.

As shown in FIG. 6, host (602) is shown in the form of a general-purpose computing device. The components of host (602) may include, but are not limited to, one or more processors or processing units (604), e.g. hardware processors, a system memory (606), and a bus (608) that couples various system components including system memory (606) to processing unit (604). Bus (608) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA)

bus, Enhanced ISA (EISA) bus, Video Electronics Standards Association (VESA) local bus, and Peripheral Component Interconnects (PCI) bus. Host (602) typically includes a variety of computer system readable media. Such media may be any available media that is accessible by host (602) and it includes both volatile and non-volatile media, removable and non-removable media.

Memory (606) can include computer system readable media in the form of volatile memory, such as random access memory (RAM) (630) and/or cache memory (632). By way of example only, storage system (634) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (608) by one or more data media interfaces.

Program/utility (640), having a set (at least one) of program modules (642), may be stored in memory (606) by way of example, and not limitation, as well as an operating system, one or more application programs, other program modules, and program data. Each of the operating systems, one or more application programs, other program modules, and program data or some combination thereof, may include an implementation of a networking environment. Program modules (642) generally carry out the functions and/or methodologies of embodiments to support and enable reinforcement learning through random action replay for natural language (NL). For example, the set of program modules (642) may include the tools (152) and (154) as described in FIG. 1A.

Host (602) may also communicate with one or more external devices (614), such as a keyboard, a pointing device, etc.; a display (624); one or more devices that enable a user to interact with host (602); and/or any devices (e.g., network card, modem, etc.) that enable host (602) to communicate with one or more other computing devices. Such communication can occur via Input/Output (I/O) interface(s) (622). Still yet, host (602) can communicate with one or more networks such as a local area network (LAN), a general wide area network (WAN), and/or a public network (e.g., the Internet) via network adapter (620). As depicted, network adapter (620) communicates with the other components of host (602) via bus (608). In an embodiment, a plurality of nodes of a distributed file system (not shown) is in communication with the host (602) via the I/O interface (622) or via the network adapter (620). It should be understood that although not shown, other hardware and/or software components could be used in conjunction with host (602). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (606), including RAM (630), cache (632), and storage system (634), such as a removable storage drive and a hard disk installed in a hard disk drive.

Computer programs (also called computer control logic) are stored in memory (606). Computer programs may also be received via a communication interface, such as network adapter (620). Such computer programs, when run, enable the computer system to perform the features of the present embodiments as discussed herein. In particular, the computer programs, when run, enable the processing unit (604) to perform the features of the computer system. Accordingly, such computer programs represent controllers of the computer system.

In an embodiment, host (602) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
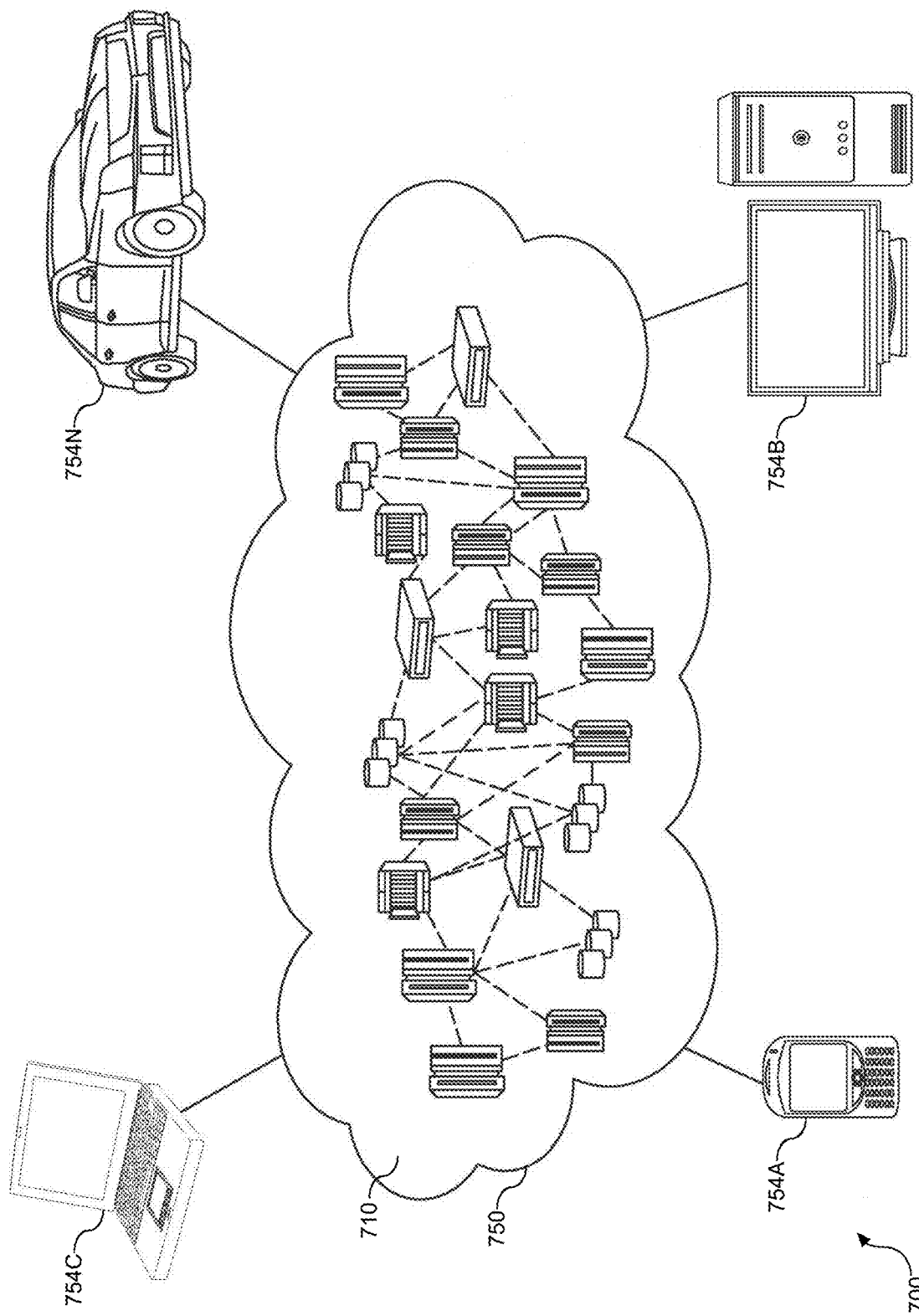
FIG. 7 depicts a block diagram illustrating a cloud computer environment.

Referring now to FIG. 7, an illustrative cloud computing network (700). As shown, cloud computing network (700) includes a cloud computing environment (750) having one or more cloud computing nodes (710) with which local computing devices used by cloud consumers may communicate. Examples of these local computing devices include, but are not limited to, personal digital assistant (PDA) or cellular telephone (754A), desktop computer (754B), laptop computer (754C), and/or automobile computer system (754N). Individual nodes within nodes (710) may further communicate with one another. They may be grouped (not shown) physically or virtually, in one or more networks, such as Private, Community, Public, or Hybrid clouds as described hereinabove, or a combination thereof. This allows cloud computing environment (700) to offer infrastructure, platforms and/or software as services for which a cloud consumer does not need to maintain resources on a local computing device. It is understood that the types of computing devices (754A-N) shown in FIG. 7 are intended to be illustrative only and that the cloud computing environment (750) can communicate with any type of computerized device over any type of network and/or network addressable connection (e.g., using a web browser).

Figure 8:
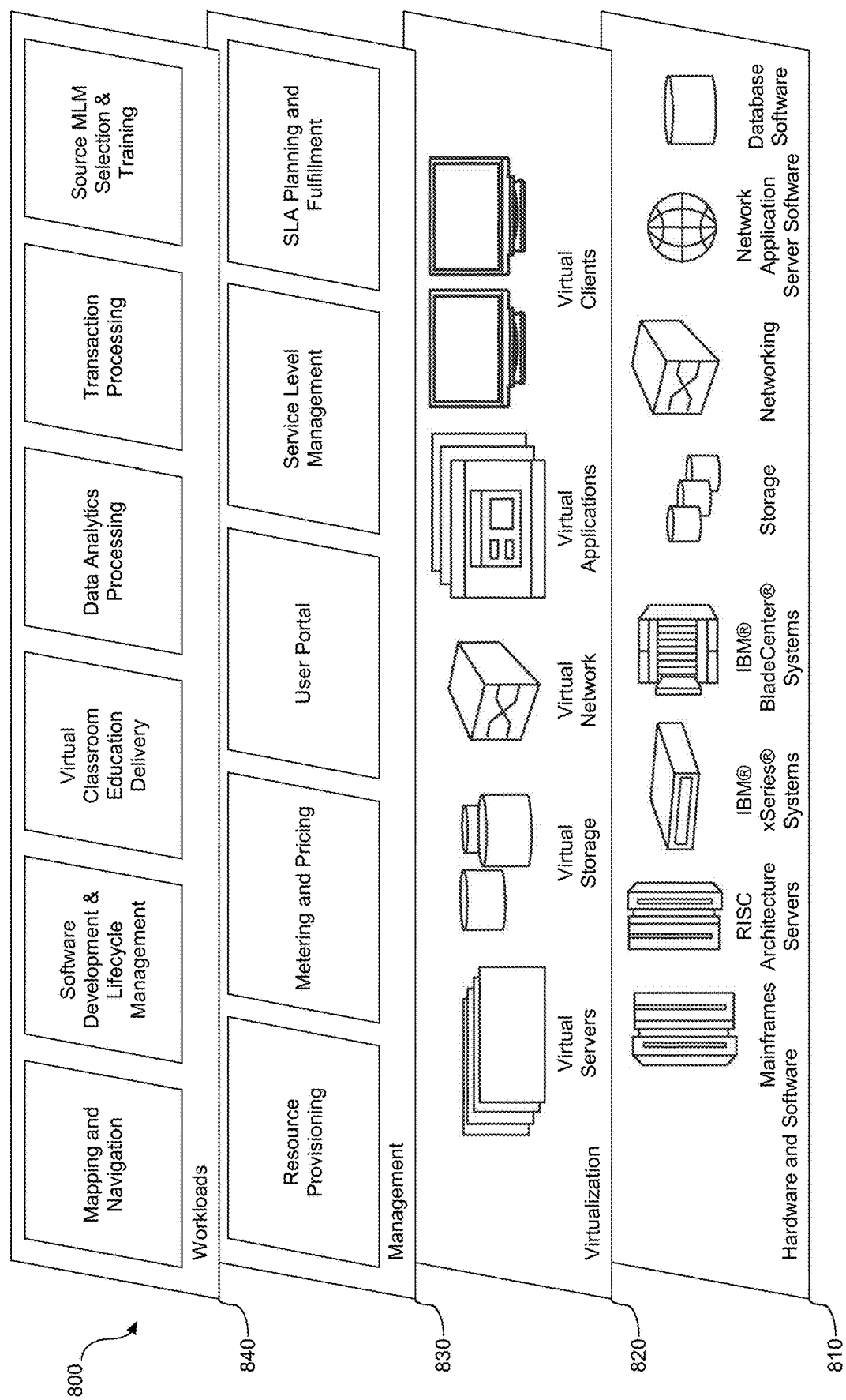
FIG. 8 depicts a block diagram illustrating a set of functional abstraction model layers provided by the cloud computing environment.

Referring now to FIG. 8, a set of functional abstraction layers (800) provided by the cloud computing network of FIG. 7 is shown. It should be understood in advance that the components, layers, and functions shown in FIG. 8 are intended to be illustrative only, and the embodiments are not limited thereto. As depicted, the following layers and corresponding functions are provided: hardware and software layer (810), virtualization layer (820), management layer (830), and workload layer (840).

The hardware and software layer (810) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (820) provides an abstraction layer from which the following examples of virtual entities may be provided: virtual servers; virtual storage; virtual networks, including virtual private networks; virtual applications and operating systems; and virtual clients.

In one example, management layer (830) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (840) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and source MLM selection and training.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product are operative to provide improvements to transfer learning operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Additional blocks not represented in the Figures may be included, for example, prior to, subsequent to, or concurrently with one or more illustrated blocks. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In particular, transfer learning operations may be carried out by different computing platforms or across multiple devices. Furthermore, the data storage and/or corpus may be localized, remote, or spread across multiple systems. Accordingly, the scope of protection of the embodiments is limited only by the following claims and their equivalents.

What is claimed is:

1. A computer system comprising:
    a processor operatively coupled to memory; and
    an artificial intelligence (AI) platform, in communication with the processor, having machine learning (ML) tools, the tools comprising:
        a machine learning model (MLM) manager configured to:
            access a plurality of pre-trained source MLMs;
            input a plurality of data objects of a test dataset into each of the source MLMs, the test dataset comprising the plurality of data objects associated with labels; and
            for each of the source MLMs, generate associated labels from the inputted data objects;
        a metric manager configured to, for each of the source MLMs, calculate a metric reflecting a similarity between the labels of the test dataset and the generated labels;
        the MLM manager further configured to select a base MLM to be used for transfer learning from the plurality of source MLMs based upon the calculated metric;
        a training manager configured to train the selected base MLM with a target dataset for the target domain; and
        the MLM manager further configured to capture knowledge of the selected base MLM, including:
            use a context representation layer of the selected base MLM; and
            replace a classification layer of the selected base MLM with a new classifier mapped to space of the target dataset,
        wherein the calculated metric is limited to a position of a returned output, and the position is selected from a span, a bounding box, or a location.

2. The computer system of claim 1, wherein the metric manager is further configured to:
    determine, for each of the source MLMs, a respective score based on at least one respective source dataset used to pre-train the source MLM, the score representing an accuracy measure of the source MLM with respect to a respective source domain; and
    include, for each of the source MLMs, the determined score as a weight in the calculated metric.

3. The computer system of claim 1, wherein the calculated metric comprises, for each of the source MLMs, an assessment of the labels of the test dataset compared to generated labels associated with the source MLMs, wherein each of the assessments is individually selected as a true positive, a false positive, or a false negative.

4. The computer system of claim 3, wherein:
    the true positive is defined as a match between the label of the dataset and the compared generated label associated with the source MLM;
    the false positive is defined as a match between the offset of an extracted mention and a non-match with ground truth; and
    the false negative is defined as a non-match with the offset of the extracted mention and a non-match with ground truth.

5. The computer system of claim 4, further comprising the metric manager to:
    determine an accuracy measure of one or more inferences of the target dataset processed by one of the source MLMs, the accuracy measure to ignore returned labels and limit consideration to: the position, span, bounding box, or location of the returned output, and an accuracy measure of the source MLM on a source dataset; and
    leverage the determined accuracy measure to calculate a weight of each of the source MLMs.

6. A computer program product to utilize machine learning to facilitate transfer learning, the computer program product comprising:
    a tangible computer readable storage medium having program code embodied therewith, the program code executable by a processor to:
        access a plurality of pre-trained source machine learning models;
        for each of the source MLMs:
            input a plurality of data objects of a test dataset into each of the source MLMs, the test dataset comprising the plurality of data objects associated with labels;
            generate associated labels from the inputted data objects; and
            calculate a metric reflecting a similarity between the labels of the test dataset and the generated labels;
        select a base MLM to be used for transfer learning from the plurality of source MLMs based upon the calculated metric; and
    train the selected base MLM with a target dataset for the target domain,
    wherein program code is executable by the processor to capture knowledge of the selected base MLM, including:
        use a context representation layer of the selected base model; and
        replace a classification layer of the selected base model with a new classifier mapped to space of the target dataset, and
    wherein the calculated metric is limited to a position of a returned output, and the position is selected from a span, a bounding box, or a location.

7. The computer program product of claim 6, wherein the program code is executable by the processor to:
    determine, for each of the source MLMs, a respective score based on at least one respective source dataset used to pre-train the source MLM, the score representing an accuracy measure of the source MLM with respect to a respective source domain; and
    include, for each of the source MLMs, the determined score as a weight in the calculating of the calculated metric.

8. The computer program product of claim 6, wherein the calculated metric comprises, for each of the source MLMs, an assessment of the labels of the test dataset compared to generated labels associated with the source MLMs, wherein each of the assessments is individually selected as a true positive, a false positive, or a false negative.

9. The computer program product of claim 8, wherein:
the true positive is defined as a match between the label of the dataset and the compared generated label associated with the source MLM;
the false positive is defined as a match between the offset of an extracted mention and a non-match with ground truth; and
the false negative is defined as a non-match with the offset of the extracted mention and a non-match with ground truth.

10. The computer program product of claim 9, further comprising program code to:
determine an accuracy measure of one or more inferences of the target dataset processed by one of the source MLMs, the accuracy measure to ignore returned labels and limit consideration to: the position, span, bounding box, or location of the returned output, and an accuracy measure of the source MLM on a source dataset; and
leverage the determined accuracy measure to calculate a weight of each of the source MLMs.

11. A computer-implemented transfer learning method, comprising:
carrying out operations on a computing device comprising a processor operably associated with memory, the operations comprising:
accessing a plurality of pre-trained source machine learning models (MLMs);
accessing a test dataset of a target domain, the test dataset comprising a plurality of data objects associated with labels;
inputting the data objects of the test dataset into each of the source MLMs generating associated labels for each of the source MLMs;
for each of the source MLMs, calculating a metric reflecting a similarity between the labels of the test dataset and the generated labels;
selecting a base MLM to be used for transfer learning from the plurality of MLMs based upon the calculated metric; and
training the selected base MLM with a target dataset for the target domain, wherein selecting the source model as the selected base MLM further comprises capturing knowledge of the selected base MLM, including:
using a context representation layer of the selected base model; and
replacing a classification layer of the selected base model with a new classifier mapped to space of the target dataset, and
wherein the calculated metric is limited to a position of a returned output, and the position is selected from a span, bounding box, or location.

12. The method of claim 11, wherein calculating the calculated metric further comprises:
determining, for each of the source MLMs, a respective score based on at least one respective source dataset used to pre-train the source MLM, the score representing an accuracy measure of the source MLM with respect to a respective source domain; and
including, for each of the source MLMs, the determined score as a weight in the calculating of the calculated metric.

13. The method of claim 11, wherein the calculated metric comprises, for each of the source MLMs, an assessment of the labels of the test dataset compared to generated labels associated with the source MLMs, wherein each of the assessments is individually selected as a true positive, a false positive, or a false negative; and wherein the true positive is defined as a match between the label of the dataset and the compared generated label associated with the source MLM;
the false positive is defined as a match between the offset of an extracted mention and a non-match with ground truth; and
the false negative is defined as a non-match with the offset of the extracted mention and a non-match with ground truth.

14. The method of claim 13, further comprising program code to:
determine an accuracy measure of one or more inferences of the target dataset processed by one of the source MLMs, the accuracy measure to ignore returned labels and limit consideration to: position, span, bounding box, or location of the returned output, and an accuracy measure of the source MLM on a source dataset; and
leverage the determined accuracy measure to calculate a weight of each of the source MLMs.

* * * * *